April 23, 1929.   T. V. BUCKWALTER   1,709,836
RAILWAY CAR TRUCK
Filed Dec. 9, 1927

INVENTOR:
Tracy V. Buckwalter
by Barrett Barrett Gravely
HIS ATTORNEYS.

Patented Apr. 23, 1929.

1,709,836

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

RAILWAY-CAR TRUCK.

Application filed December 9, 1927. Serial No. 238,767.

My invention relates to railway car trucks of the type wherein the road wheels are fixed on an axle that is mounted inside of a tubular housing, with roller bearings interposed between said axle and said housing. On account of the heavy loads to which such bearings are subject, the cups thereof wear unevenly, the uppermost portion of such cups wearing more than the unloaded portion of the cup. The object of the present invention is to overcome this difficulty and distribute the wear more evenly throughout the bearing surface of the cup. The invention consists principally in a construction that will permit a slow rotary movement of the bearing cup sufficient to bring each element of the bearing surface to the top by a kind of creeping action.

Figure 1:
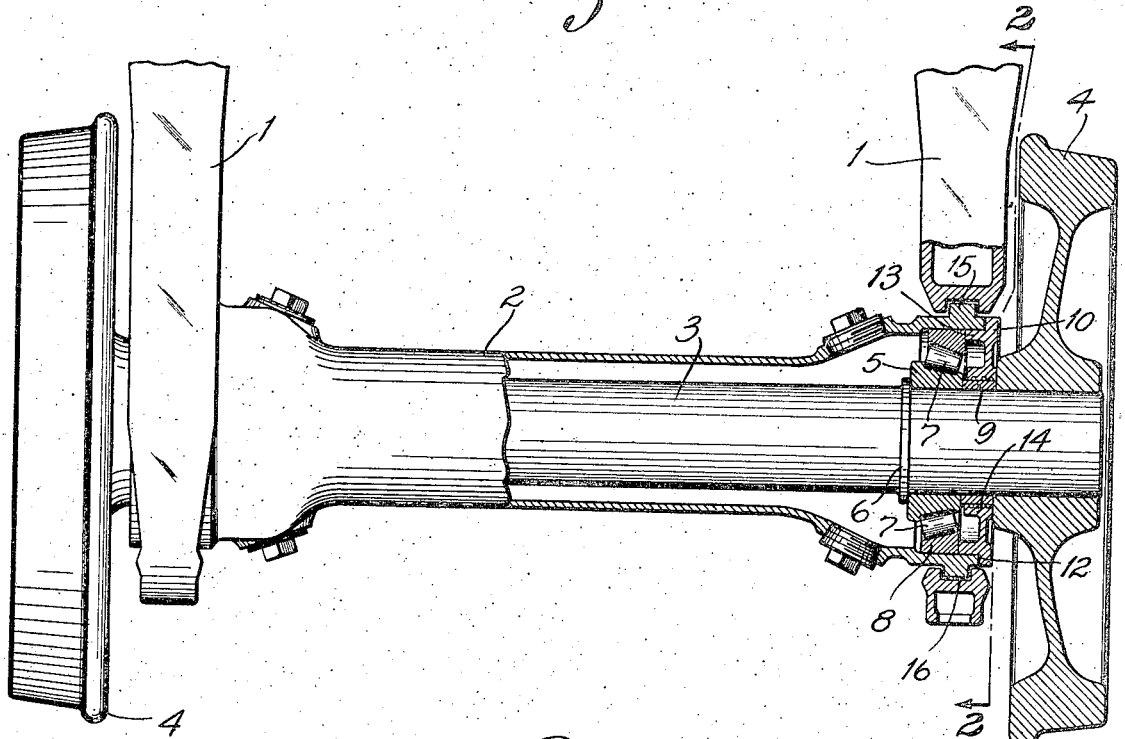
Figure 2:
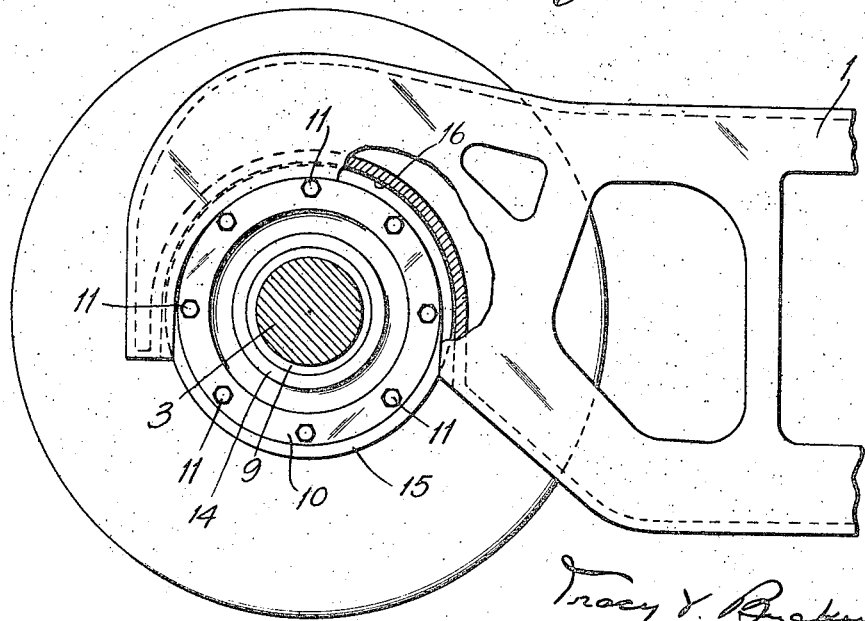

In the accompanying drawing, wherein like numerals refer to like parts wherever they occur, Fig. 1 is a plan view of the end portion of a car truck, one-half of the axle being shown in longitudinal section; and Fig. 2 is a vertical section on the line 2—2 in Fig. 1, and partly in elevation.

My truck comprises side frames 1 engaging tubular axle housings 2, axles 3 encased in said housings, roller bearings interposed between each axle and its housing and road wheels 4 fitted on the ends thereof.

Each roller bearing comprises a cone or inner bearing member 5 mounted on the axle with its larger end abutting against a shoulder 6 provided therefor on the axle. Mounted on said cone is a circular series of conical rollers 7 that cooperate with a conical cup or outer bearing member 8 which is fitted in the enlarged bore provided therefor in the end of the housing. A road wheel is mounted on the end of the axle and a spacing ring 9 is interposed between the inner face of the road wheel and the outer end of the bearing cone. The cup or outer bearing member is positioned by means of a closure 10 that overlaps the end of the housing and is secured thereto by cap screws 11, shims 12 being interposed between said closure and the end of the housing for the sake of adjustment. An annular rib 13 extends longitudinally inside of the housing and bears against the outer end of the bearing cup. The closure extends radially inwardly and has a cylindrical hub portion 14 that fits over the spacing ring and thus serves to exclude dirt and to retain oil in the housing.

Heavy loads to which bearings of this type are subject in a railway car truck cause more or less temporary deformation of the bearing cup, which deformation, coupled with the necessary tightness of the fit of the bearing cup in the housing, prevents rotary or circumferential movement of the bearing cup relative to the housing and results in a concentration of wear at the topmost portion of the bearing surface of the cup.

According to the present invention the housing is provided with a continuous circular rib 15 of proper width and height to fit a groove 16 provided therefor in the end of the side frame, with which it cooperates after the manner of a pedestal in the pedestal guides. Preferably the groove in the end of the truck frame has the same radius of curvature as said rib throughout a semicircle and is continued vertically downward at each end of said semicircle for some distance. By this arrangement, the side frames are adequately interlocked with the axle housings and still such housings are enabled to creep or rotate slowly on their own axes, and the bearing cups are turned along with the axle housing in which they are mounted. On account of such slow rotation or creeping, each portion of the bearing cup becomes successively the topmost portion thereof and as such is exposed to the greatest wear; that is to say, no portion of the bearing cup remains continuously subject to the greatest wear, but the wear is distributed throughout the entire bearing surface of the cup.

What I claim is:

1. A railway car truck comprising axles having road wheels thereon, housings encasing said axles, roller bearings interposed between each axle and its housing, and side frames connecting said housings, said housings being capable of turning on their respective axes.

2. A railway car truck comprising axles having road wheels thereon, housings encasing said axles, roller bearings interposed between each axle and its housing, and side frames connecting said housings, said housings having circular ribs and said side frames having end yokes with semicircular grooves in which the respective ribs fit, whereby each housing can turn on its own axis.

3. A railway car truck comprising axles having road wheels thereon, housings encasing said axles, roller bearings each comprising a cup, rollers and a cone interposed between each axle and its housing, and side frames, each side frame having downwardly opening yokes at its ends that straddle the ends of the housings and have interlocking engagement therewith that prevents relative bodily displacement of the housings and side frames but permits turning of the housings on their respective axes.

Signed at Canton, Ohio, this 3d day of Dec., 1927.

TRACY V. BUCKWALTER.